United States Patent
Sun et al.

(10) Patent No.: US 10,141,780 B2
(45) Date of Patent: Nov. 27, 2018

(54) MULTI-AGENT FUNCTION AND DISPATCH ON A SMART GRID MONITORING SYSTEM

(71) Applicant: Institute of Nuclear Energy Research, Atomic Energy Council, Executive Yuan, R.O.C., Taoyuan (TW)

(72) Inventors: Shyh-Wern Sun, Taoyuan (TW); Chen-Min Chan, Taoyuan (TW); Yih-Der Lee, Taoyuan (TW); Yung-Ruei Chang, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

(*) Notice: Subject to any disclaimer, the term of this patent is extended or adjusted under 35 U.S.C. 154(b) by 473 days.

(21) Appl. No.: 14/922,602

(22) Filed: Oct. 26, 2015

(65) Prior Publication Data
US 2017/0018922 A1    Jan. 19, 2017

(30) Foreign Application Priority Data
Jul. 13, 2015    (TW) .............................. 104122588 A (51) Int. Cl.
H02J 13/00    (2006.01)
G06Q 50/06    (2012.01)
(Continued)

(52) U.S. Cl.
CPC .......... H02J 13/0006 (2013.01); G06Q 50/06 (2013.01); G07F 15/00 (2013.01);
(Continued)

(58) Field of Classification Search
CPC ...... H02J 13/0006; H02J 3/005; G06Q 50/06; G07F 15/00; Y02E 60/74; Y04S 20/221; Y04S 10/30; Y02B 70/3216
See application file for complete search history.

(56) References Cited

U.S. PATENT DOCUMENTS

| 5,237,507 A * | 8/1993 | Chasek | .................. | G06Q 30/02 |
| | | | | 324/116 |
| 7,305,272 B2 | 12/2007 | Maturana et al. | | |

(Continued)

OTHER PUBLICATIONS

Merabet, G.H.; Essaaidi, M.; Talei, H.; Abid, M.R.; Khalil, N.; Madkour, M. and Benhaddou, D., "Applications of Multi-Agent Systems in Smart Grids: A Survey", 2014, IEEE.*
(Continued)

*Primary Examiner* — Mohammad Ali
*Assistant Examiner* — Kelvin Booker
(74) *Attorney, Agent, or Firm* — Locke Lord LLP; Tim Tingkang Xia, Esq.

(57) ABSTRACT

A smart grid monitoring device with multi-agent function is provided, which may include a measurement module, a communication module and a control module. The measurement module may measure at least one real-time electric signal of a power transaction system or an electric unit. The control module may execute a self-developed program to provide at least one agent functionality and then control the electric unit according to the at least one real-time electric signals measured; the communication module can transmit the at least one real-time electric signal to other monitoring devices or the main computer of the power dispatch transaction system, and can control the electric unit according to the at least one electric signal. The communication module can receive electric demand signals from the power company or other monitoring devices of the power dispatch transaction system via the main computer to execute the electricity transaction with the bidding mechanism.

15 Claims, 10 Drawing Sheets

10

(51) Int. Cl.
*G07F 15/00* (2006.01)
*H02J 3/00* (2006.01)

(52) U.S. Cl.
CPC ........... *H02J 3/005* (2013.01); *Y02B 70/3216* (2013.01); *Y02E 60/74* (2013.01); *Y04S 10/30* (2013.01); *Y04S 20/221* (2013.01)

(56) References Cited

U.S. PATENT DOCUMENTS

| | | | | |
|---|---|---|---|---|
| 2008/0249916 | A1* | 10/2008 | Kirch | G06Q 30/06 705/37 |
| 2011/0225064 | A1* | 9/2011 | Fou | G06Q 20/12 705/26.41 |
| 2013/0254117 | A1* | 9/2013 | von Mueller | G06Q 20/3829 705/71 |
| 2016/0012465 | A1* | 1/2016 | Sharp | G06Q 20/18 705/14.17 |
| 2016/0281607 | A1* | 9/2016 | Asati | F02C 9/28 |

OTHER PUBLICATIONS

Roche, R.; Blunier, B.; Miraoui, A.; Hilaire, V. and Koukam, A., "Multi-Agent Systems for Grid Energy Management: A Short Review", Dec. 2010, IEEE Xplore.*

Rogers, A.; Ramchurn, S.D. and Jennings, N.R., "Delivering the Smart Grid: Challenges for Autonomous Agents and Multi-Agent Systems Research", 2012, Proceedings of the 26$^{th}$ Association for the Advancement of Artificial Intelligence(AAAI) Conference on Artificial Intelligence.*

Yilmaz, C.; Albayrak, S. and Lutzenberger, M., "Smart Grid Architectures and the Multi-Agent System Pradigm", 2014, 4$^{th}$ Intl Conference on Smart Grids, Green Communications and IT Energy-aware Technologies, ISBN: 978-1-61208-332-2.*

* cited by examiner

MULTI-AGENT FUNCTION AND DISPATCH ON A SMART GRID MONITORING SYSTEM

CROSS-REFERENCE TO RELATED APPLICATION

This application claims the benefit of China Patent Application No. 104122588, filed on Jul. 13, 2015, in the Taiwan Intellectual Property Office the disclosure of which is incorporated herein in its entirety by reference.

BACKGROUND OF THE INVENTION

1. Field of the Invention

The present invention generally relates to a monitoring device, in particular to a monitoring device applicable to a power dispatch transaction system. The present invention further relates to a power dispatch transaction system with the monitoring devices.

2. Description of the Related Art

As the power demand increases year by year, the conventional centralized grid faces a lot of challenges; for instance, the capacities of its power transmission equipment and power distribution equipment are limited; besides, the conventional centralized grid cannot store electricity, so restrictions on electricity use may always take place during the peak period of power demand. In recent years, many kinds of local distributed generation systems composed of distributed generation equipment (e.g. solar energy, wind energy, biomass energy and the like) and power consumers are developed; these systems can be connected to the centralized grid in parallel, which breaks through the conventional vertical power supply mode. Accordingly, the power system monitoring equipment and data acquisition equipment of the conventional centralized grid can no longer meet the requirements of the distributed generation system. In addition to the advanced power, control, information and communication technologies, the distributed generation system is further required to be able to easily expand the generation equipment and power consumers in the grid; for the reason, it is necessary to develop a power system monitoring equipment capable of conveniently connecting the generation equipment and the power consumers to the distributed generation system.

Micro-gird is a local distributed generation system with self-management function, which can not only reduce the impact on the generation system when new generation equipment is connected to the generation system in parallel, but also can be swiftly disconnected from the AC power grid to independently operate if necessary. Multi-agent system can independently operate without too many manual operations; besides, the agents can communicate with one another via a special communication language and can execute commands according to pre-designed calculation logic; therefore, multi-agent system is the best choice to realize a grid control system. However, conventional multi-agent systems still have a lot of shortcomings to be overcome.

U.S. Pat. No. 7,305,272 disclosed a controller with agent function, which can realize a power dispatch transaction system with multi-agent function. Nevertheless, the controller cannot measure the electric signals of the electric equipment when the electric equipment is in operation; thus, the controller cannot acquire the real-time electric signals. Besides, the controller has no time synchronization function, so all equipment of the power dispatch transaction system cannot be synchronized in time; therefore, the controller cannot precisely control the power dispatch transaction system. Moreover, the controller cannot provide appropriate electric demand response control function and power dispatch function, so the power dispatch transaction system cannot achieve stable status. As described above, the controller can no longer satisfy the practical requirements of users.

Thus, it has become an important issue to provide a device capable of precisely controlling the power dispatch transaction system, stabilizing the power dispatch transaction system and increasing the added-value of the power dispatch transaction system.

SUMMARY OF THE INVENTION

Therefore, it is one of the primary objectives of the present invention to provide a smart grid monitoring device with multi-agent function and a power dispatch transaction system to overcome the shortcomings that the conventional controllers cannot precisely control the power dispatch transaction system and cannot stabilize the power dispatch transaction system.

According to one aspect of the present invention, one embodiment of the present invention provides a smart grid monitoring device with multi-agent function is provided, which may include a measurement module, a communication module and a control module. The measurement module may measure real-time electric signals of a power dispatch transaction system or an electric unit. The communication module may be coupled to the main computer and the other monitoring devices of the power dispatch transaction system, and the main computer may be coupled to a power company. The control module may be coupled to the electric unit externally, as well as the measurement module and the communication module internally, and execute a self-developed program to provide at least one agent function and then control the electric unit according to the real-time electric signals measured. The communication module can transmit the real-time electric signals to other monitoring devices or the main computer of the power dispatch transaction system, and can control the electric unit according to the electric signals. The communication module can received electricity demand signals from the power company or the other monitoring devices of the power dispatch transaction system via the main computer for the main computer to execute an electricity transaction with bidding mechanism.

In a preferred embodiment of the present invention, each monitoring device may provide one or more than one agent functions, and the agent functions may include one or more or more than one of the generation agent function, the load agent function and the storage agent function, etc.

In a preferred embodiment of the present invention, the real-time electric signals may include one or more than one of the voltage signal, the current signal, the frequency signal, the real power signal, the virtual power signal and the power factor signal, etc.

In a preferred embodiment of the present invention, the electric unit may be a generation unit, a consumption unit or a storage unit.

In a preferred embodiment of the present invention, the monitoring device may further include a time-stamp module and the time-stamp module may be coupled to the control module and may provide the time stamps to the real-time electric signals.

In a preferred embodiment of the present invention, the time-stamp module may execute the time synchronization via the GPS system or Network Time Protocol (NTP).

In a preferred embodiment of the present invention, the monitoring device may execute an electricity transaction with the time-of-use mechanism.

In a preferred embodiment of the present invention, the bidding mechanism can be achieved by providing bonus.

In a preferred embodiment of the present invention, when the control module receives an electricity generation increase request from the power company, the monitoring device may transmit a permissible electricity decrease and a desired electricity generation decrease bonus to the main computer.

In a preferred embodiment of the present invention, when the control module receives an electricity generation increase from the power company via the main computer, the control module may transmit a permissible electricity increase and a desired electricity generation increase bonus to the main computer.

In a preferred embodiment of the present invention, when the main computer receives the electricity purchase request from any one of the monitoring devices, the main computer may execute an electricity transaction with deal-making mechanism.

In a preferred embodiment of the present invention, the deal-making mechanism may be achieved by providing bonus.

In a preferred embodiment of the present invention, when the control module receives the electricity purchase request via the main computer, the control module may transmit a permissible electricity sales and a desired electricity sales bonus to the main computer for the main computer to execute the electricity transaction with the deal-making mechanism.

According to another aspect of the present invention, another embodiment of the present invention further provides a power dispatch transaction system, which may include a plurality of electric units, a plurality of monitoring devices and a main computer. The monitoring device may be coupled to one another, and each monitoring device may be corresponding to one of the electric units, and may provide at least one agent function to control the corresponding electric unit; each monitoring device may measure the real-time electric signals of the power dispatch transaction system or the corresponding electric unit. The main computer may be coupled to the monitoring devices and a power company. Any one of the monitoring devices may transmit the real-time electric signals to the other monitoring devices or the main computer of the power dispatch transaction system, or control the corresponding electric device according to the real-time electric signals; the main computer may receive the electric demand signals from the power company or the other monitoring devices of the power dispatch transaction system via the main computer so as to execute the electricity transaction with the bidding mechanism.

In a preferred embodiment of the present invention, each monitoring device may include a measurement module and the measurement module may measure the real-time electric signals.

In a preferred embodiment of the present invention, each monitoring device may further include a communication module and the communication module may be coupled to the main computer of the power dispatch transaction system and the other monitoring devices.

In a preferred embodiment of the present invention, each monitoring device may further include a control module, and the control module may be coupled to the electric unit, the measurement module and the communication module; the control module may execute a self-developed program to provide at least one agent function and then control the corresponding electric unit according to the real-time electric signals.

In a preferred embodiment of the present invention, the control module may be an embedded-type programmable control module.

In a preferred embodiment of the present invention, each monitoring device may further include a time-stamp module and the time-stamp module may be coupled to the control module and may provide the time stamps to the real-time electric signals.

In a preferred embodiment of the present invention, the time-stamp module may execute the time synchronization via the GPS system or Network Time Protocol (NTP).

In a preferred embodiment of the present invention, each monitoring device may provide one or more than one agent function, and the agent functions may include one or more than one of the generation agent function, the load agent function and the storage agent function.

In a preferred embodiment of the present invention, the real-time electric signals may include one or more than one of the voltage signal, the current signal, the frequency signal, the real power signal, the virtual power signal and the power factor signal, etc.

In a preferred embodiment of the present invention, the electric unit may be a generation unit, a consumption unit or a storage unit.

In a preferred embodiment of the present invention, the bidding mechanism can be achieved by providing bonus.

In a preferred embodiment of the present invention, when the main computer transmits an electricity generation increase request from the power company to any one of the monitoring devices, the monitoring device may transmit a permissible electricity increase and a desired electricity generation increase bonus to the main computer.

In a preferred embodiment of the present invention, the main computer receives an electricity purchase request from any one of the monitoring devices of the power dispatch transaction system, the main computer may transmit the electricity purchase request to the other monitoring devices to execute an electricity transaction with the deal-making mechanism.

In a preferred embodiment of the present invention, the deal-making mechanism can be achieved by providing bonus.

In a preferred embodiment of the present invention, when the main computer receives the electricity purchase request, the main computer may transmit the electricity purchase request to the other monitoring devices to execute the electricity transaction with the deal-making mechanism; the monitoring devices receiving the electricity purchase request may respectively transmit a permissible electricity sales and a desired electricity sales bonus to the monitoring device transmitting the electricity purchase request via the main computer.

In a preferred embodiment of the present invention, if the monitoring device transmitting the electricity purchase request agrees the permissible electricity sales and the desired electricity sales bonus, the main computer terminates the electricity transaction with the deal-making mechanism.

In a preferred embodiment of the present invention, if the monitoring device transmitting the electricity purchase request does not agree the permissible electricity sales and the desired electricity sales bonus, the main computer may repeat the electricity transaction with the deal-making mechanism.

The smart grid monitoring device with multi-agent function and the power dispatch transaction system according to the embodiments of the present invention have the following advantages:

(1) In one embodiment of the present invention, the monitoring device can include a measurement module, which can measure the electric signals of the electric unit when the electric unit is in operation so as to obtain real-time electric signals; the measurement module can directly transmit the measured real-time electric signals to the control module without any external communication devices; in this way, the control module can precisely transmit real-time command in a short time according to the received real-time electric signals so as to control the electric unit coupled to the monitoring device, or exchange information with the other monitoring devices of the power dispatch transaction system. Accordingly, these monitoring devices can accurately control the power dispatch transaction system.

(2) In one embodiment of the present invention, the monitoring device can further include a time-stamp module, which can provide time stamps to the real-time electric signals to precisely mark the time of each of the real-time electric signals; thus, the real-time electric signals can still have precise time-stamps even if transmitted by the communication module; in this way, all monitoring devices of the power dispatch transaction system can be synchronized in time. Accordingly, these monitoring devices can more accurately control the power dispatch transaction system.

(3) In one embodiment of the present invention, the monitoring device can further include an embedded-type programmable control module, which can provide one or more than one agent functions, such as the generation agent function, the load agent function and the storage agent function, etc. Accordingly, these monitoring devices can perfectly realize the power dispatch transaction system with multi-agent function.

(4) In one embodiment of the present invention, the power dispatch transaction system can provide a variety of electricity transaction functions; accordingly, the power dispatch transaction system can completely provide the electric demand response control function and the power dispatch function to further stabilize the power dispatch transaction system.

(5) In one embodiment of the present invention, the power dispatch transaction system can execute the electricity transaction with bidding mechanism, deal-making mechanism or time-of-use mechanism, so the power dispatch transaction system can purchase or sell electricity via various business modes. Therefore, the added-value of the power dispatch transaction system can be further increased.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
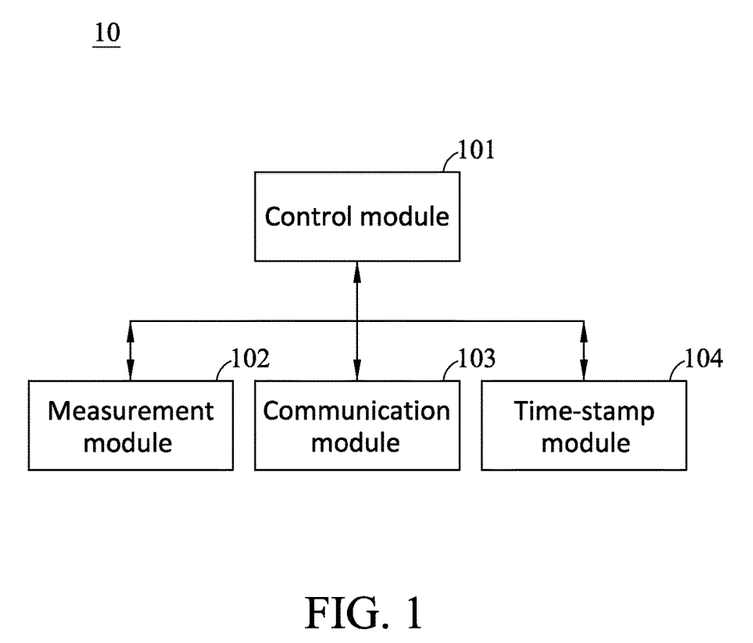
FIG. 1 is the schematic view of the first embodiment of the smart grid monitoring device with multi-agent function in accordance with the present invention.

Please refer to FIG. 1, which is the schematic view of the first embodiment of the smart grid monitoring device with multi-agent function in accordance with the present invention. As shown in FIG. 1, the monitoring device 10 may be applied to a power dispatch transaction system, and the power dispatch transaction system may include a plurality of the monitoring devices 10; each monitoring device 10 may be coupled to the corresponding electric unit, and the electric unit may be a generation unit, a consumption unit or a storage unit, etc. The monitoring device 10 may include a measurement module 102, a communication module 103, a control module 101 and a time-stamp module 104.

The measurement module 102 may measure the real-time electric signals of the power dispatch transaction system or the electric unit, and the real-time electric signals may include one or more than one of voltage signal, current signal, frequency signal, real power signal, virtual power signal and power factor signal. The communication module 13 may be coupled to the main computer of the power dispatch transaction system and other monitoring devices 10, and the main computer may be coupled to the power company. The time-stamp module 104 may be coupled to the control module 101, and can provide time-stamps for the real-time electric signals so as to mark accurate times on all real-time electric signals, wherein the time-stamp module 104 can execute the time synchronization via the GPS system or Network Time Protocol (NTP) in order to make sure all monitoring devices can be synchronized in time. The control module 101 may be coupled to the electric unit externally, as well as the measurement module 102 and the communication module 103 internally, and may exchange information with the electric unit, the measurement module 102, the communication module 103 and the time-stamp module 104; the control module 101 can execute a self-developed program to provide at least one agent function and then control the electric unit according to the real-time electric signal, wherein the agent function may include one or more or more than one of the generation agent function, the load agent function and the storage agent function, and the control module 101 may be an embedded-type programmable control module.

More specifically, the control module 101 can transmit the real-time electric signals, the electric demand signals to the other monitoring devices 10 of the power dispatch transaction system, or control the electric unit according to the real-time electric signals; besides, the control module 10 can further receive the electric demand signals from the power company or the other monitoring devices 10 of the power dispatch transaction system so as to execute various electricity transactions, such as the electricity transaction with bidding mechanism or deal-making mechanism. Furthermore, the communication module 103 can receive the electricity price information from the power company via the main computer, so the control module 101 can execute the electricity transaction with time-of-use mechanism accordingly.

It is worthy to point out that the controller of the conventional power dispatch transaction system cannot measure the electric signals of an electric unit when the electric unit is in operation; thus, the controller cannot acquire the real-time electric signals, so the controller cannot accurately control the power dispatch transaction system. On the contrary, the monitoring device 10 of the embodiment may further include the measurement module 102, which can measure the real-time electric signals without any external communication devices, and can directly transmit the real-time electric signals measured to the control module 101; in this way, the control module 101 can precisely control the electric unit coupled to the monitoring device 10, or exchange information with the other monitoring devices 10 of the power dispatch transaction system or the main computer via the communication module 103. Accordingly, these monitoring devices 10 can accurately control the power dispatch transaction system.

Besides, the controller of the conventional power dispatch transaction system cannot provide the time synchronization function, so all monitoring devices of the conventional power dispatch transaction system cannot be synchronized in time; thus, the conventional power dispatch transaction system cannot be precisely controlled. On the contrary, the monitoring device 10 of the embodiment may further include a time-stamp module 104, which can add the time-stamps to the real-time electric signals measured by the measurement module 102 for the purpose of accurately marking the times of all real-time electric signals; in this way, all monitoring devices 10 of the power dispatch transaction system can be synchronized in time, so these monitoring devices can more accurately control the power dispatch transaction system.

Furthermore, the power dispatch transaction system in accordance to the embodiment of the present invention can provide the electricity transaction functions with the bidding mechanism, the deal-making mechanism or the time-of-use mechanism; therefore, the power dispatch transaction system can provide complete electric demand response control function and power dispatch function, so the power dispatch transaction system can be more stable.

Figure 2:
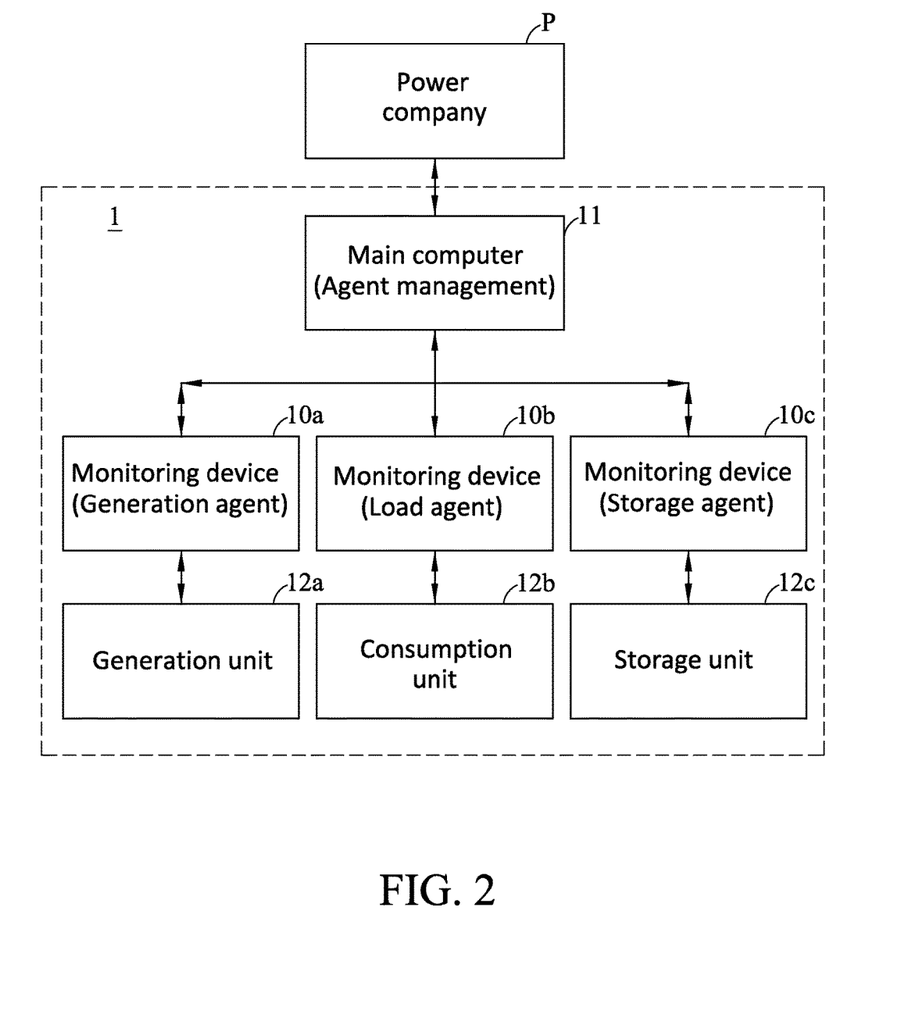
FIG. 2 is the schematic view of the first embodiment of the power dispatch transaction system with the monitoring devices in accordance with the present invention.

Please refer to FIG. 2, which is the schematic view of the first embodiment of the power dispatch transaction system with monitoring devices in accordance with the present invention. As shown in FIG. 2, the power dispatch transaction system 1 may include a plurality of electric units 12a, 12b and 12c, a plurality of monitoring devices 10a, 10b and 10c, and a main computer 11. More specifically, the main computer 11 can provide the agent management function to manage the monitoring devices 10a, 10b and 10c. The monitoring device 10a may be coupled to the generation unit 12a and can provide the generation agent function, which can supply electricity; the monitoring device 10b may be coupled to the consumption unit 12b and can provide the load agent function, which is the consumer of the power dispatch transaction system 1; the monitoring device 10c may be coupled to the storage unit 12c and can provide the storage agent function, which can store or supply electricity.

These monitoring devices 10a, 10b and 10c may be coupled to one another, and each of the monitoring devices 10a, 10b and 10c can measure the real-time electric signals of the power dispatch transaction system 1 or the corresponding electric units 12a, 12b and 12c. The main computer 11 may be coupled to the monitoring devices 10a, 10b and 10c, and the power company P. Any one of the monitoring devices 10a, 10b and 10c can transmit the real-time electric signals to the other monitoring devices of the power dispatch transaction system 1 or the main computer 11, or control the corresponding electric units 12a, 12b and 12c according to the real-time electric signals.

The main computer 11 can transmit the electric demand signals from the power company P or the monitoring device 10b of the power dispatch transaction system 1 to the monitoring device 10a or the monitoring device 10c so as to execute the electricity transaction with the bidding mechanism or the deal-making mechanism. Besides, the monitoring device 10c can receive the electricity price information from the power company P via the main computer 11 so as to execute the electricity transaction with the time-of-use mechanism accordingly.

Figure 3:
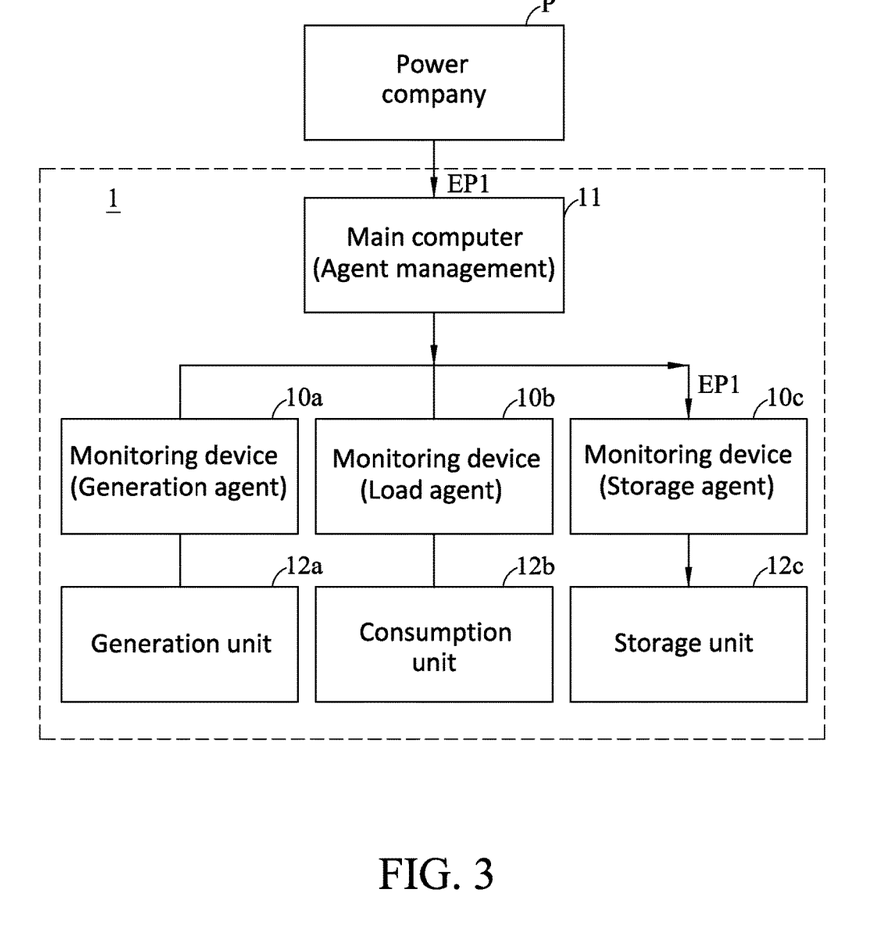
FIG. 3 is the schematic view of the second embodiment of the power dispatch transaction system with the monitoring devices in accordance with the present invention.

Please refer to FIG. 3, which is the schematic view of the second embodiment of the power dispatch transaction system with monitoring devices in accordance with the present invention; the embodiment illustrates an example that the power dispatch transaction system 1 executes the electricity transaction with the time-of-use mechanism.

As shown in FIG. 3, the monitoring device 10c can provide the storage agent function, which can receive the electricity price information EPI from the power company P via the main computer 11, and then check whether the current electricity price is lower than the predetermined threshold according to the electricity price information EPI. If the current electricity price is lower than the predetermined threshold, the monitoring device 10c will store the electricity supplied by the power company P into the storage unit 12c for future use; if the current electricity price is higher than the predetermined threshold, the monitoring device 10c will not store the electricity supplied by the power company P into the storage unit 12c.

Figure 4:
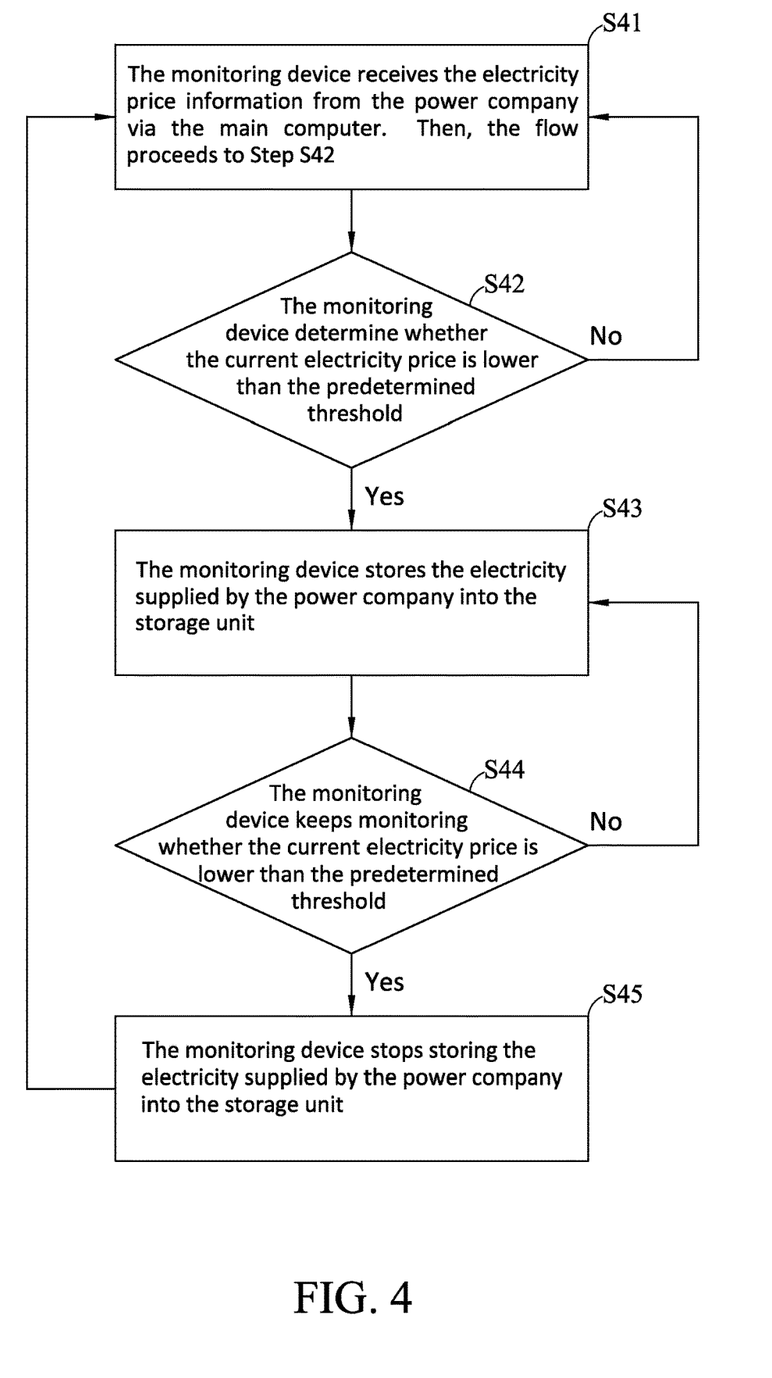
FIG. 4 is the flow chart of the second embodiment of the power dispatch transaction system with the monitoring devices in accordance with the present invention.

Please refer to FIG. 4, which is the flow chart of the second embodiment of the power dispatch transaction system with monitoring devices in accordance with the present invention; the embodiment may include the following steps:

In Step S41: the monitoring device receives the electricity price information from the power company via the main computer. Then, the flow proceeds to Step S42.

In Step S42: the monitoring device checks whether the current electricity price is lower than the predetermined threshold. If it is, the flow proceeds to Step S43; if it is not, the flow returns to Step 41.

In Step S43: the monitoring device stores the electricity supplied by the power company into the storage unit. Then, the flow proceeds to Step S44.

In Step S44: the monitoring device keeps monitoring whether the current electricity price is lower than the predetermined threshold. If it is, the flow returns to Step S43; if it is not, the flow proceeds to Step 45.

In Step S45: the monitoring device stops storing the electricity supplied by the power company into the storage unit. Then, the flow returns to Step 41.

Figure 5:
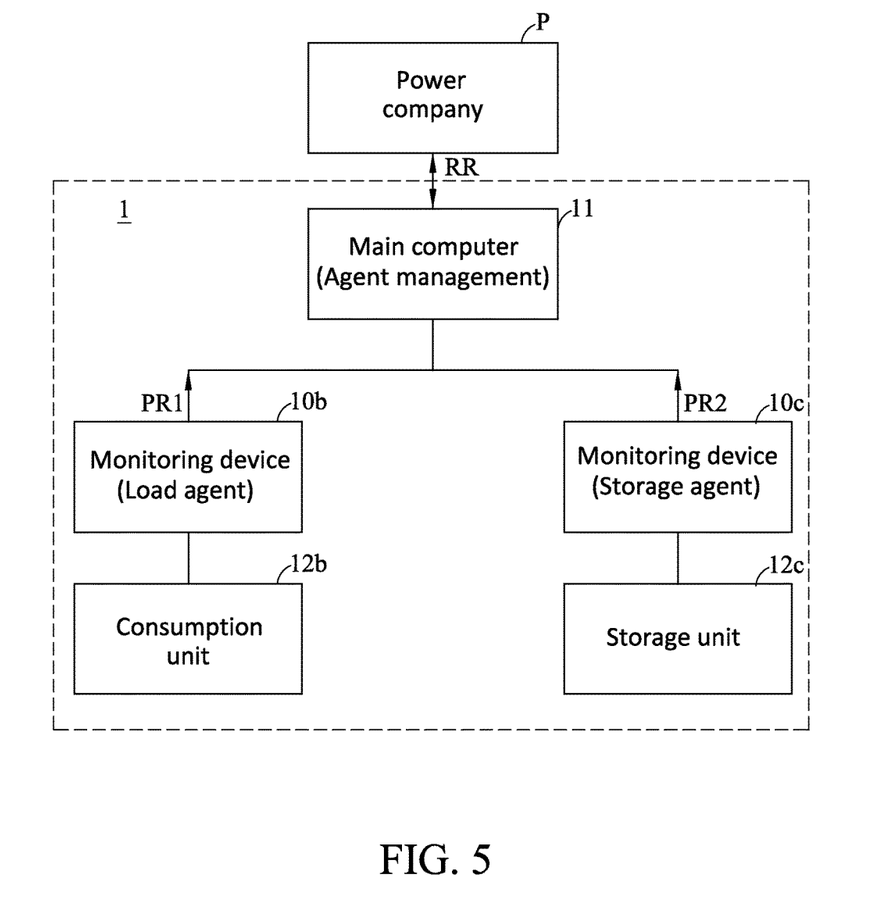
FIG. 5 is the schematic view of the third embodiment of the power dispatch transaction system with the monitoring devices in accordance with the present invention.

Please refer to FIG. 5, which is the schematic view of the third embodiment of the power dispatch transaction system with monitoring devices in accordance with the present invention; the embodiment illustrates an example that the power dispatch transaction system 1 executes the electricity transaction with the bidding mechanism. As shown in FIG. 5, the power dispatch transaction system 1 may include a plurality of electric units 12a and 12b, a plurality of monitoring devices 10b and 10c, and a main computer 11. More specifically, the main computer 11 can provide the agent management function to manage the monitoring devices 10b and 10c. The monitoring device 10b may be coupled to the consumption unit 12b and can provide the load agent function; the monitoring device 10b may be coupled to the storage unit 12c and can provide the storage agent function.

When the power company P hopes to decrease the electricity consumption of the power dispatch transaction system 1 during a certain time period, the power company P can transmit an electricity consumption decrease request RR to the main computer 11, where the electricity consumption decrease request RR may include the electricity consumption decrease required by the power company P and the bonus provided by the power company P. Then, the main computer 11 may transmit the electricity consumption decrease request RR from the power company P to all monitoring devices of the power dispatch transaction system 1, including the monitoring devices 10b and 10c.

After the monitoring devices 10b and 10c receive the electricity consumption decrease request RR, the monitoring devices 10b and 10c can check whether they can satisfy the electricity consumption decrease request RR; afterward, the monitoring devices 10b and 10c can respectively transmit their desired prices PR1 and PR2 to the main computer 11, where the desired prices PR1 and PR2 may respectively include the permissible electricity consumption decrease and the desired electricity consumption decrease bonus required by each of the monitoring devices 10b and 10c.

Next, the main computer 11 may announce the desired prices PR1 and PR2 of the monitoring devices 10b and 10c, and then check whether there are other agents willing to reduce their desired electricity consumption decrease bonuses to win the bid in the electricity transaction. After the bidding process ends, the main computer 11 may check whether the total electricity consumption decrease can meet the requirement of the power company P. If the total electricity consumption decrease fails to meet the requirement of the power company P, the main computer 11 will not reply to the power company P; if the total electricity consumption decrease can meet the requirement of the power company P, the main computer 11 will transmits a message to notify the power company that the main computer 11 agrees to decrease the electricity consumption. Then, after the power company P transmits a confirmation notification to the main computer 11, the main computer 11 will transmit the confirmation notification to the agent winning the bid in the electricity transaction.

Figure 6:
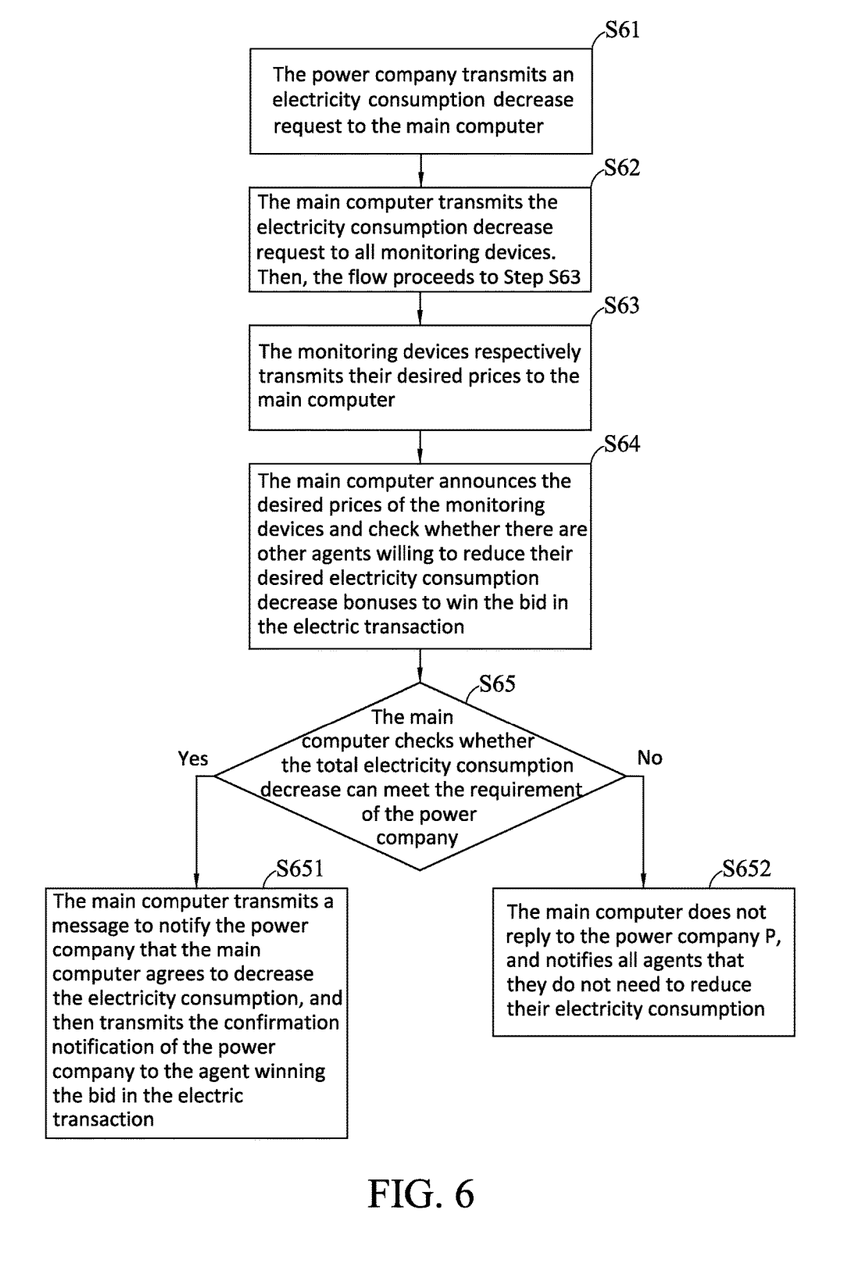
FIG. 6 is the flow chart of the third embodiment of the power dispatch transaction system with the monitoring devices in accordance with the present invention.

Please refer to FIG. 6, which is the flow chart of the third embodiment of the power dispatch transaction system with monitoring devices in accordance with the present invention; the embodiment may include the following steps:

In Step S61: the power company transmits an electricity consumption decrease request to the main computer. Then, the flow proceeds to Step S62.

In Step S62: the main computer transmits the electricity consumption decrease request to all monitoring devices. Then, the flow proceeds to Step S63.

In Step S63: the monitoring devices respectively transmits their desired prices to the main computer. Then, the flow proceeds to Step S64.

In Step S64: the main computer announces the desired prices of the monitoring devices and check whether there are other agents willing to reduce their desired electricity consumption decrease bonuses to win the bid in the electricity transaction. Then, the flow proceeds to Step S65.

In Step S65: the main computer checks whether the total electricity consumption decrease can meet the requirement of the power company. If it is, the flow proceeds to Step S651; if it is not, the flow proceeds to Step 652.

In Step S651: the main computer transmits a message to notify the power company that the main computer agrees to decrease the electricity consumption, and then transmits the confirmation notification of the power company to the agent winning the bid in the electricity transaction.

In Step S652: the main computer does not reply to the power company P, and notifies all agents that they do not need to reduce their electricity consumption.

Figure 7:
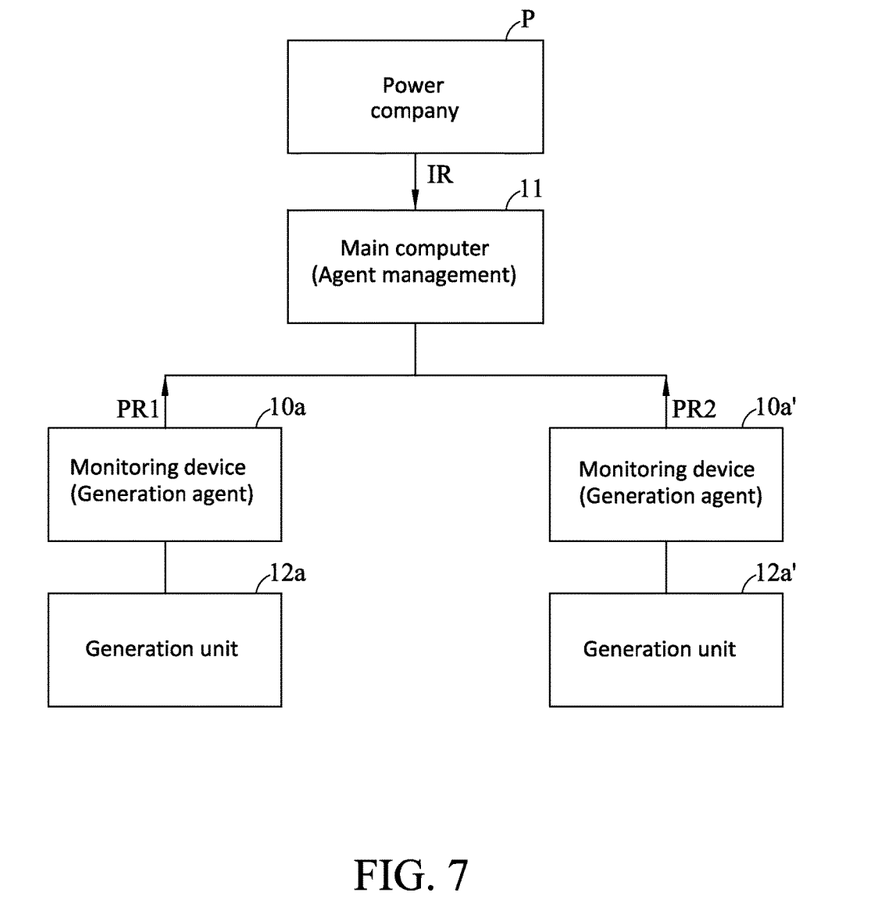
FIG. 7 is the schematic view of the fourth embodiment of the power dispatch transaction system with the monitoring devices in accordance with the present invention.

Please refer to FIG. 7, which is the schematic view of the fourth embodiment of the power dispatch transaction system with monitoring devices in accordance with the present invention; the embodiment illustrates another example that the power dispatch transaction system 1 executes the electricity transaction with the bidding mechanism.

As shown in FIG. 7, the power dispatch transaction system 1 may include a plurality of electric units 12a and 12a', a plurality of monitoring devices 10a and 10a', and a main computer 11. More specifically, the main computer 11 can provide the agent management function to manage the monitoring devices 10a and 10a'. The monitoring devices 10a and 10a' may be respectively coupled to the generation units 12a and 12a', and can provide the generation agent function.

When the power company P hopes to increase the electricity generation of the power dispatch transaction system 1 during a certain time period, the power company P can transmit an electricity generation increase request IR to the main computer 11, where the electricity generation increase request IR may include the electricity generation increase required by the power company P and the bonus provided by the power company P. Then, the main computer 11 may transmit the electricity generation increase request IR from the power company P to all monitoring devices of the power dispatch transaction system 1, including the monitoring devices 10a and 10a'.

After the monitoring devices 10a and 10a' receive the electricity generation increase request IR, the monitoring devices 10a and 10a' can check whether they can satisfy the electricity generation increase request IR; afterward, the monitoring devices 10a and 10a' can respectively transmit their desired prices PR1 and PR2 to the main computer 11, where the desired prices PR1 and PR2 may respectively include the permissible electricity generation increase and the desired electricity generation increase bonus required by each of the monitoring devices 10a and 10a'.

Next, the main computer 11 may announce the desired prices NU and PR2 of the monitoring devices 10a and 10a', and then check whether there are other agents willing to reduce their desired electricity generation increase bonuses to win the bid in the electricity transaction. After the bidding process ends, the main computer 11 may check whether the total electricity generation increase can meet the requirement of the power company P. If the total electricity generation increase fails to meet the requirement of the power company P, the main computer 11 will not reply to the power company P; if the total electricity generation increase can meet the requirement of the power company P, the main computer 11 will transmits a message to notify the power company that the main computer 11 agrees to increase the electricity generation. Then, after the power company P transmits a confirmation notification to the main computer 11, the main computer 11 will transmit the confirmation notification to the agent winning the bid in the electricity transaction.

Figure 8:
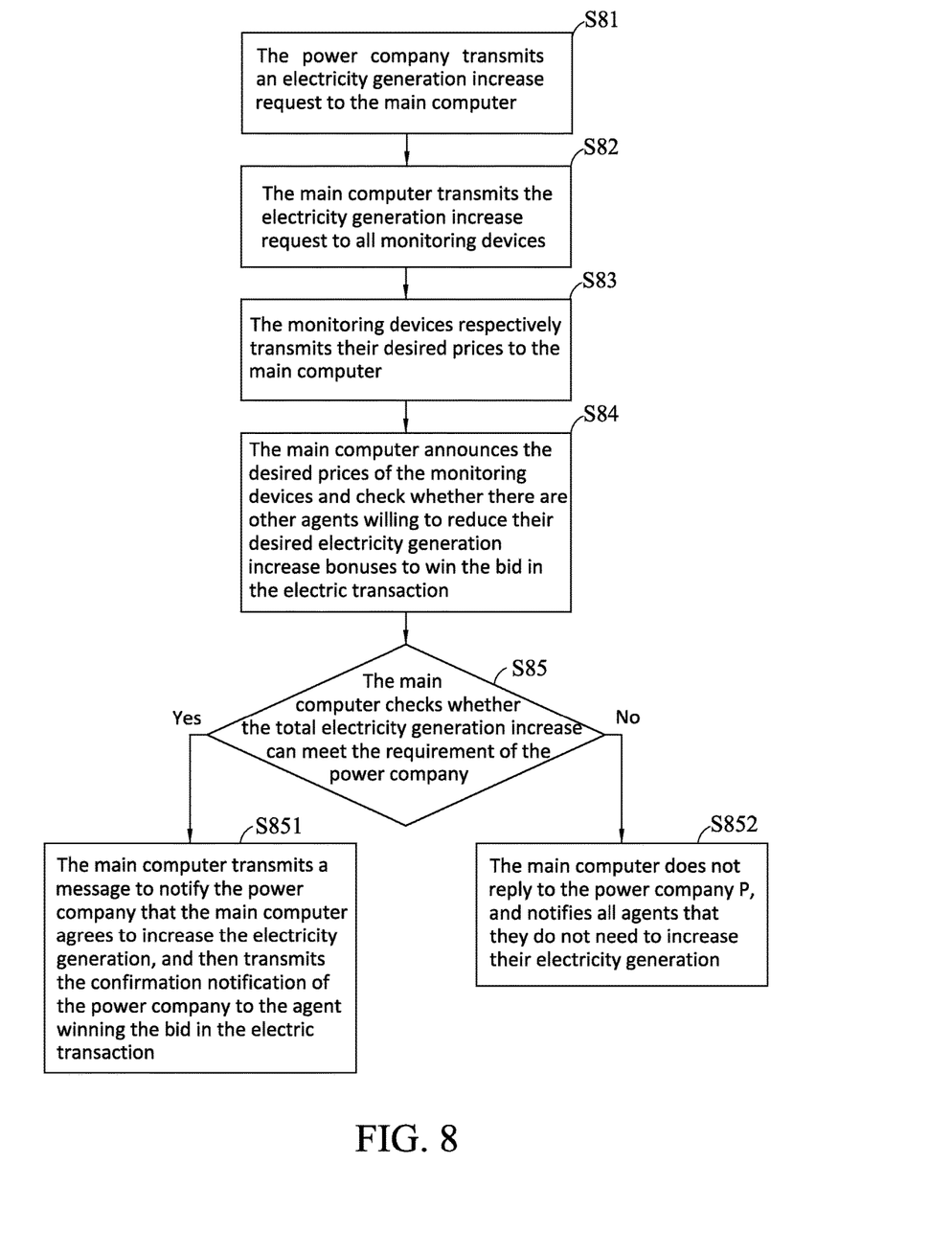
FIG. 8 is the flow chart of the fourth embodiment of the power dispatch transaction system with the monitoring devices in accordance with the present invention.

Please refer to FIG. 8, which is the flow chart of the fourth embodiment of the power dispatch transaction system with monitoring devices in accordance with the present invention; the embodiment may include the following steps:

In Step S81: the power company transmits an electricity generation increase request to the main computer. Then, the flow proceeds to Step S82.

In Step S82: the main computer transmits the electricity generation increase request to all monitoring devices. Then, the flow proceeds to Step S83.

In Step S83: the monitoring devices respectively transmits their desired prices to the main computer. Then, the flow proceeds to Step S84.

In Step S84: the main computer announces the desired prices of the monitoring devices and check whether there are other agents willing to reduce their desired electricity generation increase bonuses to win the bid in the electricity transaction. Then, the flow proceeds to Step S85.

In Step S85: the main computer checks whether the total electricity generation increase can meet the requirement of the power company. If it is, the flow proceeds to Step S851; if it is not, the flow proceeds to Step S852.

In Step S851: the main computer transmits a message to notify the power company that the main computer agrees to increase the electricity generation, and then transmits the confirmation notification of the power company to the agent winning the bid in the electricity transaction.

In Step S852: the main computer does not reply to the power company P, and notifies all agents that they do not need to increase their electricity generation.

It is worthy to point out that the conventional power dispatch transaction system cannot provide appropriate electric demand response control function and power dispatch function, so the conventional power dispatch transaction system cannot reach stable status. On the contrary, the power dispatch transaction system according to the above embodiments can provide various electricity transaction functions, such as the electricity transaction with the bidding mechanism; in addition, the power dispatch transaction system can further provide the electricity transaction function with time-of-use mechanism; thus, the power dispatch transaction system can be more stable. As described above, the present invention definitely has an inventive step.

Figure 9:
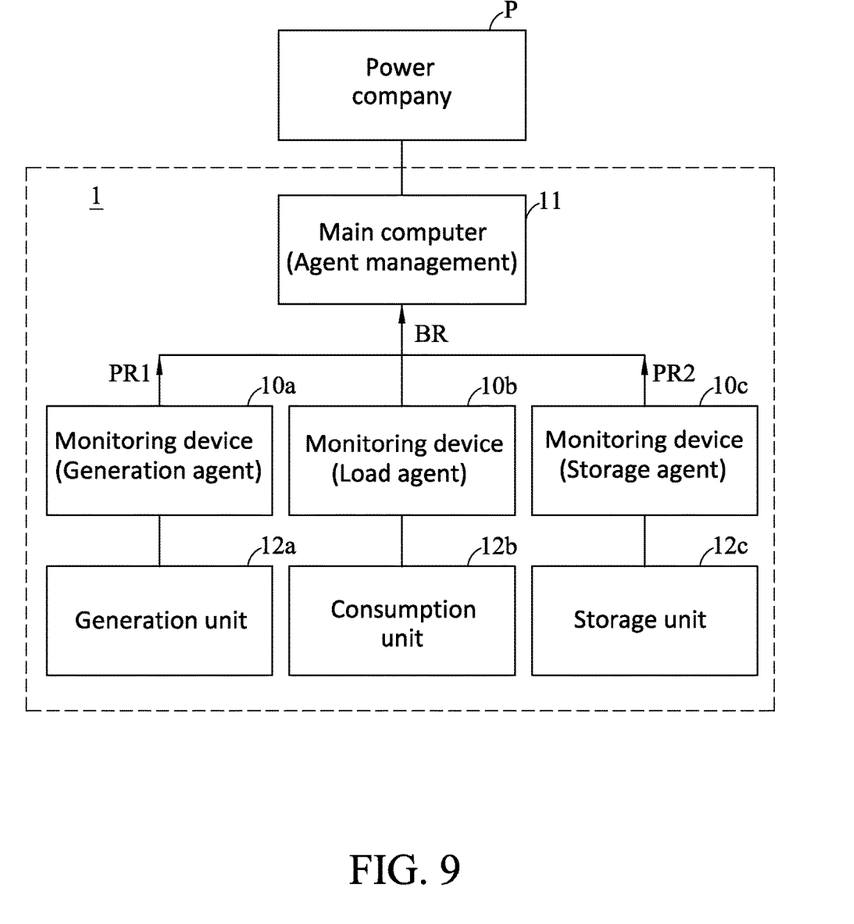
FIG. 9 is the schematic view of the fifth embodiment of the power dispatch transaction system with the monitoring devices in accordance with the present invention.

Please refer to FIG. 9, which is the schematic view of the fifth embodiment of the power dispatch transaction system with monitoring devices in accordance with the present invention; the embodiment illustrates an example that the power dispatch transaction system 1 executes the electricity transaction with the deal-making mechanism. As shown in FIG. 9, the power dispatch transaction system 1 may include a plurality of electric units 12a, 12b and 12c, a plurality of monitoring devices 10a, 10b and 10c, and a main computer 11. More specifically, the main computer 11 can provide the agent management function to manage the monitoring devices 10a, 10b and 10c. The monitoring device 10a may be coupled to the generation unit 12a, and can provide the generation agent function; the monitoring device 10b may be coupled to the consumption unit 12b, and can provide the load agent function; the monitoring devices 10c may be coupled to the storage unit 12c, and can provide the storage agent function.

When the monitoring device 10b with the load agent function hopes to increase its electricity consumption, the monitoring device 10b can transmit an electricity purchase request BR to the main computer 11, where the electricity purchase request BR may include the desired electricity purchase amount and bonus provided by the monitoring device 10b. Then, the main computer 11 may transmit the electricity purchase request BR from the monitoring device 10b to all of the other monitoring devices of the power dispatch transaction system 1, including the monitoring devices 10a and 10c.

After the monitoring devices 10a and 10c receive the electricity purchase request BR, the monitoring devices 10a and 10c can check whether they can satisfy the electricity purchase request BR; afterward, the monitoring devices 10a and 10c can respectively transmit their desired prices PR1 and PR2 to the main computer 11, where the desired prices PR1 and PR2 may respectively include the permissible electricity sales and the desired electricity sales bonus required by each of the monitoring devices 10a and 10c.

Next, the main computer 11 may transmit the desired prices PR1 and PR2 of the monitoring devices 10a and 10c to the monitoring device 10b, and then the monitoring device 10b can check whether the desired prices PR1 and PR2 can satisfy its electricity purchase request BR. If the desired prices PR1 and PR2 can satisfy the electricity purchase request BR, the monitoring device 10b will transmit a confirmation notification to the main computer 11, and the main computer will transmit the confirmation notification to the agent winning the bid in the electricity transaction; if the desired prices PR1 and PR2 fail to satisfy the electricity purchase request BR, the monitoring device 10b will re-transmit the electricity purchase request BR to the main computer 11 for the main computer 11 to repeat the deal-making mechanism until both of the buyer and the seller agree the price. If the main computer 11 can successfully help the buyer make a deal with any one of the sellers, the main computer 11 can cancel the electricity purchase request BR of the monitoring device 10b.

As described above, the power dispatch transaction system according to the above embodiments can not only provide the electricity transaction with bidding mechanism, but also can provide the electricity transaction with deal-making mechanism; in this way, all agents in the power dispatch transaction system can freely conduct a variety of electricity transactions.

Figure 10:
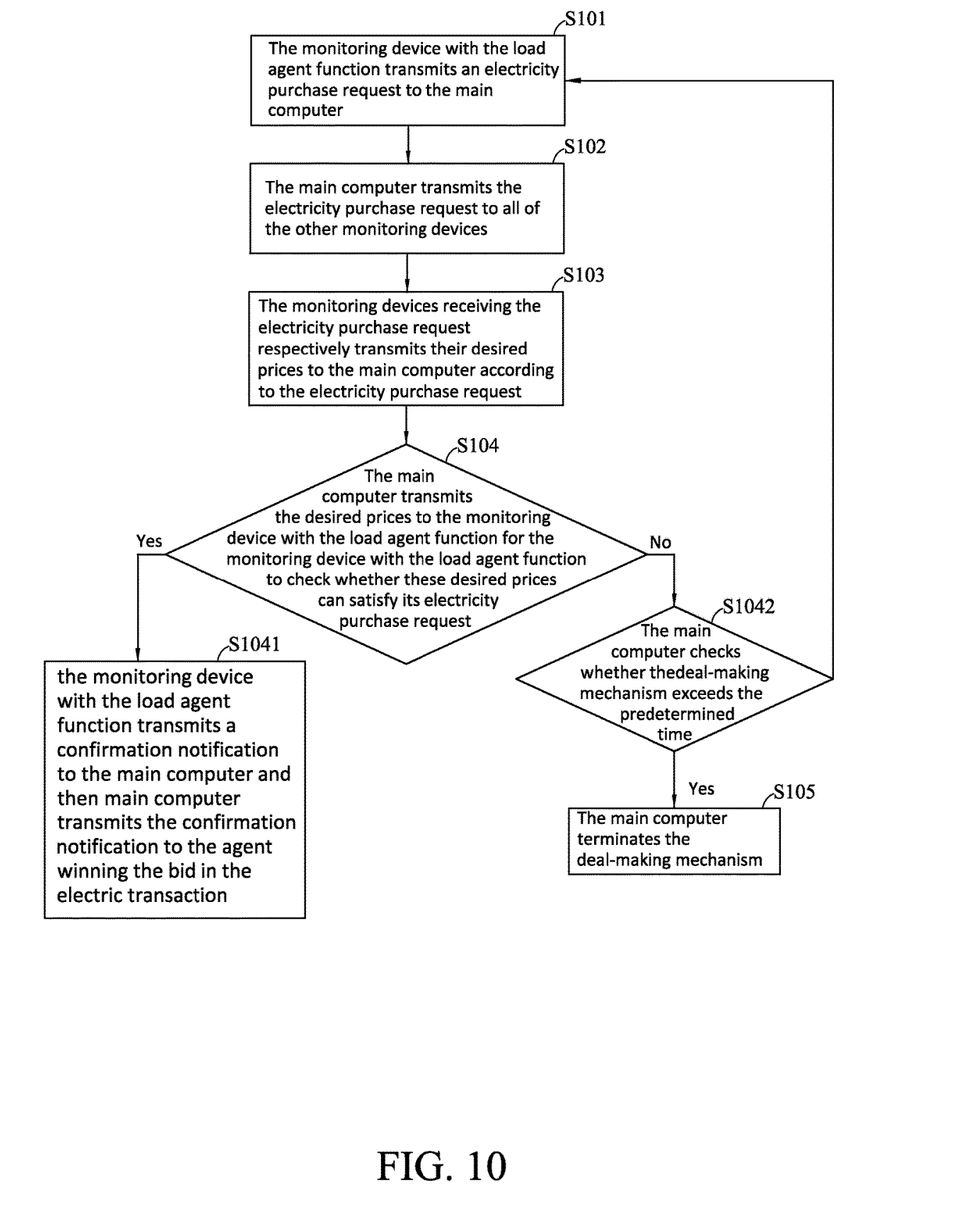
FIG. 10 is the flow chart of the fifth embodiment of the power dispatch transaction system with the monitoring devices in accordance with the present invention.

Please refer to FIG. 10, which is the flow chart of the fifth embodiment of the power dispatch transaction system with monitoring devices in accordance with the present invention; the embodiment may include the following steps:

In Step S101: the monitoring device with the load agent function transmits an electricity purchase request to the main computer. Then, the flow proceeds to Step S102.

In Step S102: the main computer transmits the electricity purchase request to all of the other monitoring devices. Then, the flow proceeds to Step S103.

In Step S103: the monitoring devices receiving the electricity purchase request respectively transmits their desired prices to the main computer according to the electricity purchase request. Then, the flow proceeds to Step S104.

In Step S104: the main computer transmits the desired prices to the monitoring device with the load agent function for the monitoring device with the load agent function to check whether these desired prices can satisfy its electricity purchase request. Then, the flow proceeds to Step S105. If it does, the flow proceeds to Step S1041; if it does not, the flow proceeds to Step S1042.

In Step S1041: the monitoring device with the load agent function transmits a confirmation notification to the main computer and then main computer transmits the confirmation notification to the agent winning the bid in the electricity transaction.

In Step S1042: the main computer checks whether the deal-making mechanism exceeds the predetermined time. If it does, the flow proceeds to Step S105; if it does not, the flow returns to Step S101.

In Step S105: the main computer terminates the deal-making mechanism.

In one embodiment of the present invention, the monitoring device can include a measurement module, which can measure the electric signals of the electric unit when the electric unit is in operation so as to obtain real-time electric signals; the measurement module can directly transmit the measured real-time electric signals to the control module without any external communication devices; in this way, the control module can precisely transmit real-time command in a short time according to the received real-time electric signals so as to control the electric unit coupled to the monitoring device, or exchange information with the other monitoring devices of the power dispatch transaction system. Accordingly, these monitoring devices can accurately control the power dispatch transaction system.

In one embodiment of the present invention, the monitoring device can further include a time-stamp module, which can provide time stamps to the real-time electric signals to precisely mark the time of each of the real-time electric signals; thus, the real-time electric signals can still have precise time-stamps even if transmitted by the communication module; in this way, all monitoring devices of the power dispatch transaction system can be synchronized in time. Accordingly, these monitoring devices can more accurately control the power dispatch transaction system.

Also, in one embodiment of the present invention, the monitoring device can further include an embedded-type programmable control module, which can provide one or more than one agent functions, such as the generation agent function, the load agent function and the storage agent function, etc. Accordingly, these monitoring devices can perfectly realize the power dispatch transaction system with multi-agent function.

In addition, in one embodiment of the present invention, the power dispatch transaction system can provide a variety of electricity transaction functions; accordingly, the power dispatch transaction system can completely provide the electric demand response control function and the power dispatch function to further stabilize the power dispatch transaction system.

Moreover, in one embodiment of the present invention, the power dispatch transaction system can execute the electricity transaction with the bidding mechanism, deal-making mechanism or time-of-use mechanism, so the power dispatch transaction system can purchase or sell electricity via various business modes. Therefore, the added-value of the power dispatch transaction system can be significantly increased.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A multi-agent function device, applicable to be coupled to one electric unit of a power dispatch transaction system, and the monitoring device comprising:
    a measurement module, operable to measure at least one real-time electric signal of the power dispatch transaction system or the electric unit;
    a communication module, coupled to a main computer of the power dispatch transaction system and the other monitoring devices, and the main computer being coupled to a power company; and
    a control module, coupled to the electric unit externally, and coupled to the measurement module and the communication module internally, wherein the control module executes a self-developed program to determine that the control module is a generation agent, a load agent and a storage agent and then controls the electric unit according to the at least one real-time electric signal;
    wherein the communication module transmits the at least one real-time electric signal to the other monitoring devices or the main computer of the power dispatch transaction system, or receives electric demand signals from the power company or the other monitoring devices of the power dispatch transaction system via the main computer for the main computer to execute an electricity transaction with a bidding mechanism; in the bidding mechanism, when the control module is the load agent or the storage agent and receives an electricity consumption decrease request from the power company via the main computer, the control module transmits a permissible electricity consumption decrease and a desired electricity consumption decrease bonus to the main computer for the main computer to determine whether the monitor device is able to win a bid in an electricity transaction; when the control module is the generation agent or the storage agent, and receives an electricity generation increase request from the power company via the main computer, the control module transmits a permissible electricity generation increase and a desired electricity generation increase bonus to the main computer for the main computer to determine whether the monitor device is able to win the bid in the electricity transaction.

2. The multi-agent function device of claim 1, further comprising a time-stamp module and the time-stamp module is coupled to the control module and provides a time stamp to the at least one real-time electric signals.

3. The multi-agent function device of claim 1, wherein the control module executes the electricity transaction according to a time-of-use mechanism.

4. The multi-agent function device of claim 1, wherein the control module receives an electricity purchase request from the other monitoring devices of the power dispatch transaction system via the main computer, the control module transmits a permissible electricity sales and a desired electricity sales bonus to the main computer for the main computer to execute an electricity transaction with a deal-making mechanism to determine whether the permissible electricity sales and the desired electricity sales is able to satisfy the electricity purchase request.

5. A smart grid monitoring system, comprising:
a plurality of electric units;
a plurality of monitoring devices, wherein the monitoring devices are coupled to one another, and each monitoring device is corresponding to one of the electric units, and provides at least one agent function to control the corresponding electric unit, and measures at least one real-time electric signal of the power dispatch transaction system or the corresponding electric unit, wherein the at least one agent function comprises one or more or more than one of a generation agent function, a load agent function and a storage agent function; and
a main computer, coupled to the monitoring devices and a power company;
wherein any one of the monitoring devices is able to transmit the at least one real-time electric signal to the other monitoring devices or the main computer of the power dispatch transaction system, or control the corresponding electric device according to the at least one real-time electric signal; the main computer is able to receive electric demand signals from the power company or the other monitoring devices of the power dispatch transaction system via the main computer for the main computer to execute an electricity transaction with a bidding mechanism; in the bidding mechanism, when the main computer transmits an electricity consumption decrease request from the power company to any one of the monitoring devices with the load agent function or the storage agent function, the monitoring device transmits a permissible electricity consumption decrease and a desired electricity consumption decrease bonus to the main computer for the main computer to determine whether the monitor device is able to win a bid in an electricity transaction; when the main computer transmits an electricity generation increase request from the power company to any one of the monitoring devices with the generation agent function or the storage agent function, the monitoring device transmits a permissible electricity generation increase and a desired electricity generation increase bonus to the main computer for the main computer to determine whether the monitor device is able to win the bid in the electricity transaction.

6. The smart grid monitoring system of claim 5, wherein each monitoring device comprises a measurement module and the measurement module measures the at least one real-time electric signal.

7. The smart grid monitoring system of claim 6, wherein each monitoring device further comprises a communication module and the communication module is coupled to the main computer of the power dispatch transaction system and the other monitoring devices.

8. The smart grid monitoring system of claim 7, wherein each monitoring device further comprises a control module, and the control module is coupled to the electric unit, the measurement module and the communication module; the control module executes a self-developed program to determine that the control module is a generation agent, a load agent and a storage agent and then control the corresponding electric unit according to the at least one real-time electric signal.

9. The smart grid monitoring system of claim 8, wherein the control module is an embedded-type programmable control module.

10. The smart grid monitoring system of claim 9, wherein each monitoring device further comprises a time-stamp module and the time-stamp module is coupled to the control module and provides a time stamp to the at least one real-time electric signal.

11. The smart grid monitoring system of claim 5, wherein the monitoring device is able to execute an electricity transaction with a time-of-use mechanism.

12. The smart grid monitoring system of claim 5, wherein the at least one real-time electric signal comprises one or more than one of a voltage signal, a current signal, a frequency signal, a real power signal, a virtual power signal and a power factor signal; each electric unit is a generation unit, a consumption unit or a storage unit.

13. The smart grid monitoring system of claim 5, wherein when the main computer receives an electricity purchase request from any one of the monitoring devices of the power dispatch transaction system, the main computer transmits the electricity purchase request to the other monitoring devices to execute an electricity transaction with a deal-making mechanism.

14. The smart grid monitoring system of claim 13, wherein when the main computer receives the electricity purchase request, the main computer transmits the electricity purchase request to the other monitoring devices to execute the electricity transaction with the deal-making mechanism; the monitoring devices receiving the electricity purchase request transmits a permissible electricity sales and a desired electricity sales bonus to the monitoring device transmitting the electricity purchase request via the main computer.

15. The smart grid monitoring system of claim 14, wherein if the monitoring device transmitting the electricity purchase request agrees the permissible electricity sales and the desired electricity sales bonus, the main computer terminates the electricity transaction with the deal-making mechanism; if the monitoring device transmitting the electricity purchase request does not agree the permissible electricity sales and the desired electricity sales bonus, the main computer repeats the electricity transaction with the deal-making mechanism.

* * * * *